Nov. 24, 1964       P. JUNG ETAL       3,158,802
RESONANCE ABSORPTION APPARATUS AND METHOD FOR MEASURING
MAGNITUDE AND DIRECTION OF A MAGNETIC FIELD
Filed Nov. 12, 1959                    5 Sheets-Sheet 1
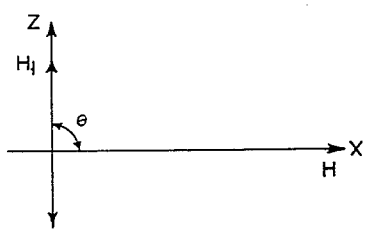
*Fig. 1.*
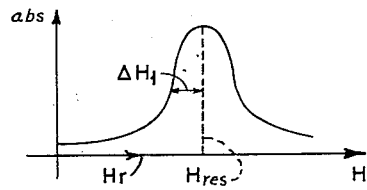
*Fig. 2.*
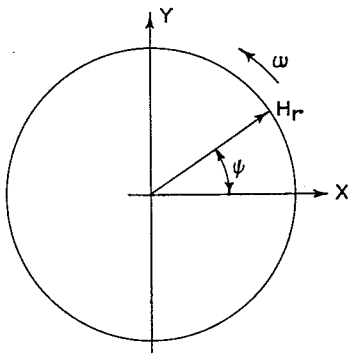
*Fig. 3.*
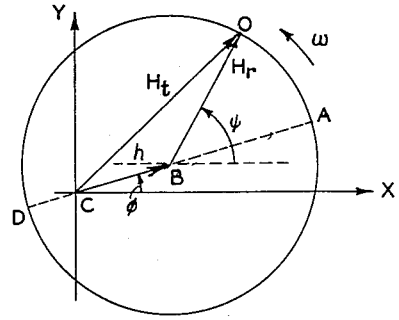
*Fig. 5.*
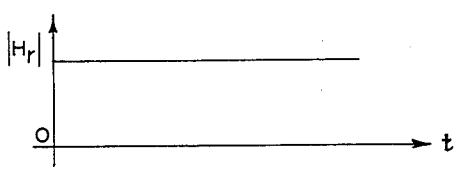
*Fig. 4.a*
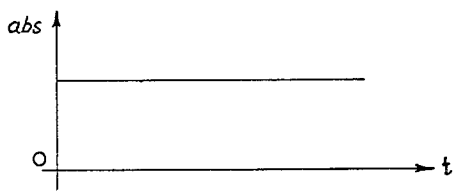
*Fig. 4.b*
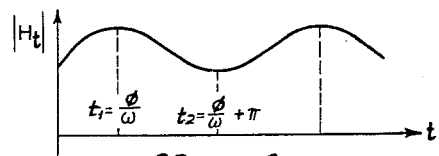
*Fig. 6.a*
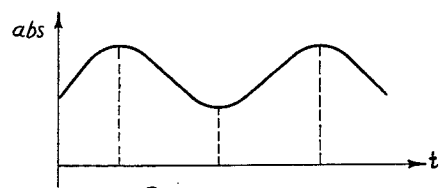
*Fig. 6.b*
INVENTORS
PAUL JUNG
JEAN VAN CAKENBERGHE
BY
ATTORNEY

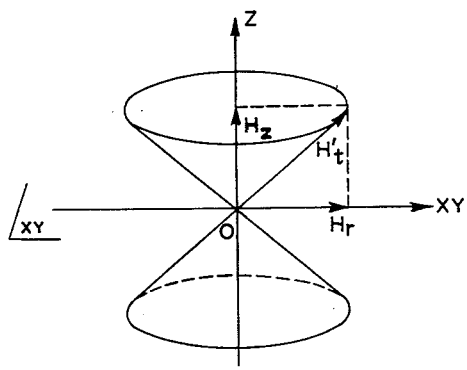
Fig. 7.
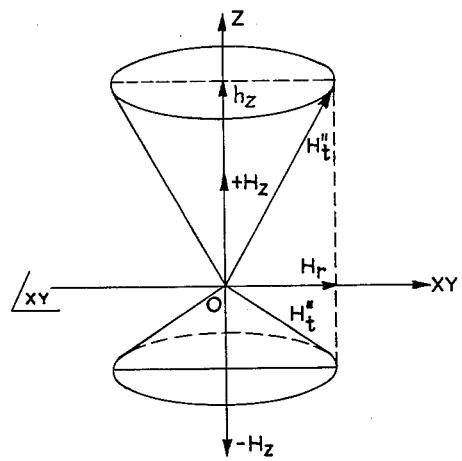
Fig. 9.
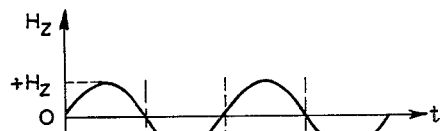
Fig. 10.a
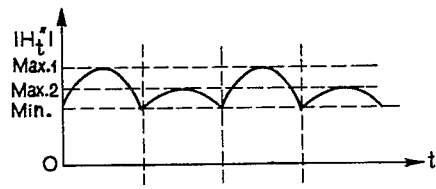
Fig. 10.b
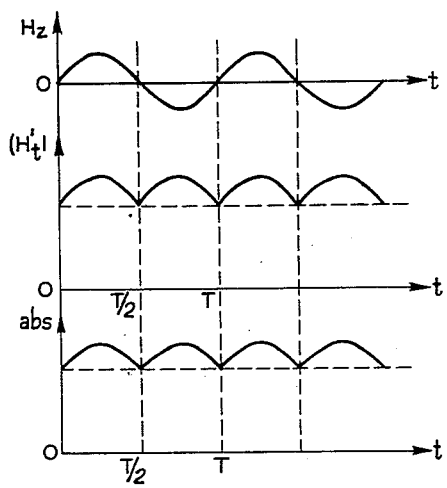
Fig. 8.
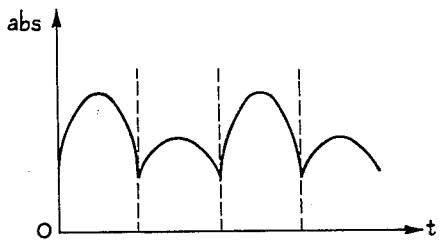
Fig. 10.c
INVENTORS
PAUL JUNG
JEAN VAN CAKENBERGHE

United States Patent Office
3,158,802
Patented Nov. 24, 1964

3,158,802
RESONANCE ABSORPTION APPARATUS AND METHOD FOR MEASURING MAGNITUDE AND DIRECTION OF A MAGNETIC FIELD
Paul Jung, Brussels, and Jean Leon Van Cakenberghe, Beersel, Belgium, assignors to Union Carbide Corporation, a corporation of New York
Filed Nov. 12, 1959, Ser. No. 852,249
2 Claims. (Cl. 324—.5)

The present invention relates in general to the determination of magnetic fields and more particularly, to the determination of the magnitude and direction of weak magnetic fields.

This is a continuation-in-part of our copending United States patent application, Serial No. 713,626, filed February 6, 1958, and entitled "Magnetometer." In that earlier application, novel apparatus for measuring one component of a magnetic field is disclosed and claimed. The operation of the previously disclosed apparatus is based on the symmetrical characteristics of a periodically reversed magnetic field. The symmetry of this field is destroyed by the external magnetic field to be measured, and the resulting asymmetry is detected by analyzing the resonance absorption of a paramagnetic substance.

The apparatus of our earlier filed application is admirably suited for determining the intensity of a magnetic field in a given direction (for example, the vertical component of the earth's magnetic field). However, the complete determination of the magnitude and direction of an external magnetic field $h$, such as the earth's magnetic field, requires in general the measurement of the three perpendicular components $h_x$, $h_y$, and $h_z$. As disclosed in our earlier filed application, the three components can be measured by using three independent alternating sweep fields perpendicular to each other and simultaneously recording their respective output signals. The apparatus of the present invention, however, not only measures the intensity of the external magnetic field, but also greatly improves upon the direction determination ability of our earlier apparatus.

It is, therefore, the main object of the present invention to provide a method and apparatus for simultaneously measuring the intensity and direction of a magnetic field.

Another object of the invention is to provide a method and appartus for rapid and simultaneous determination of the amplitude and direction of a weak magnetic field.

Other aims and advantages of the present invention will be apparent from the following description and appended claims.

In the drawings:
FIGURE 1 is a diagrammatic representation of the magnitude and direction of a high frequency magnetic field $H_1$ and a constant or slowly varying field H;

FIGURE 2 is a graph of the paramagnetic absorption of a paramagnetic substance exposed to a constant or slowly varying magnetic field H;

FIGURE 3 is a diagrammatic representation of a rotating magnetic field having a magnitude $H_r$;

FIGURE 4a is a graph of the magnitude of the rotating field $H_r$ as a function of time and FIGURE 4b is a graph of the absorption in the paramgnetic substance due to the rotating field as a function of time;

FIGURE 5 is a diagrammatic representation of a new field $H_t$ resulting from the combination of a rotating field $H_r$ and an external magnetic field $h$ at an angle $\phi$ with the x-axis;

FIGURE 6a is a graph of the magnitude of the resultant field $H_t$ as a function of time and FIGURE 6b is a graph of the absorption of the paramagnetic substance due to the resultant field;

FIGURE 7 is a diagrammatic representation of the resultant field $H'_t$ in a three-dimensional system;

FIGURE 8 shows graphs of the sweep field $H_z$, the resultant field $H'_t$, and the absorption in the paramagnetic substance, each respectively as a function of time;

FIGURE 9 is a diagrammatic representation of the field $H''_t$ resulting from the combination of field $H'_t$ and the $h_z$ component of the external magnetic field $h$;

Figure 11:
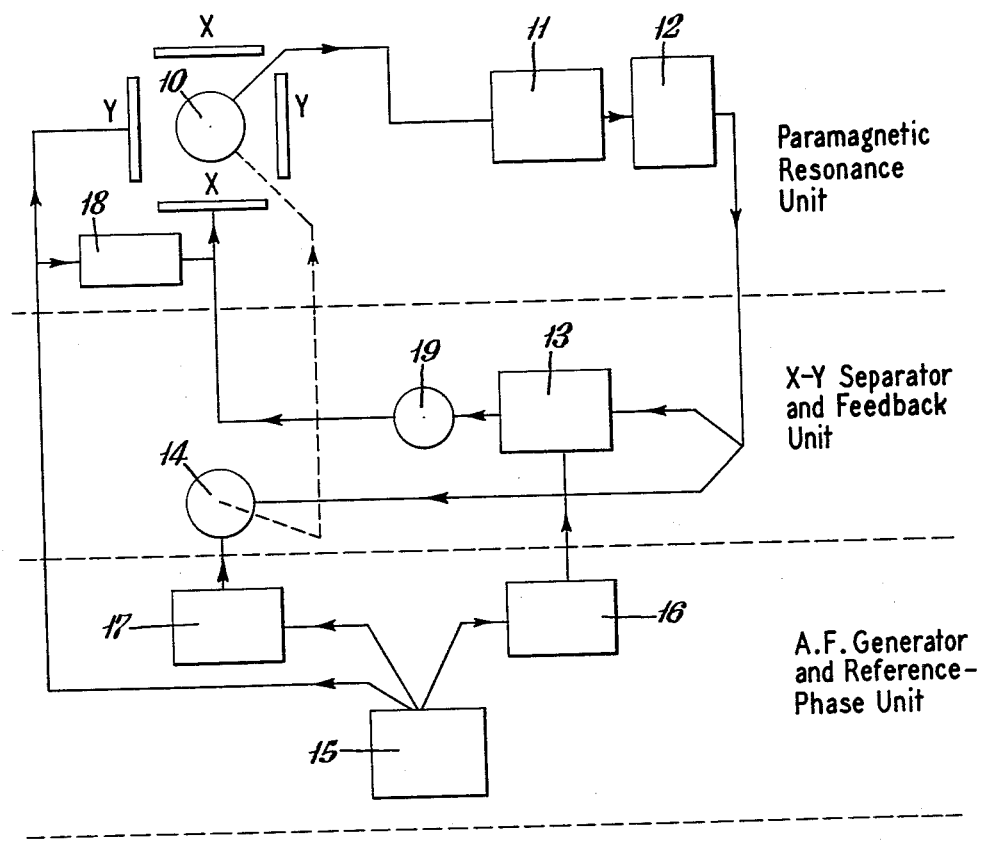
Figure 12:
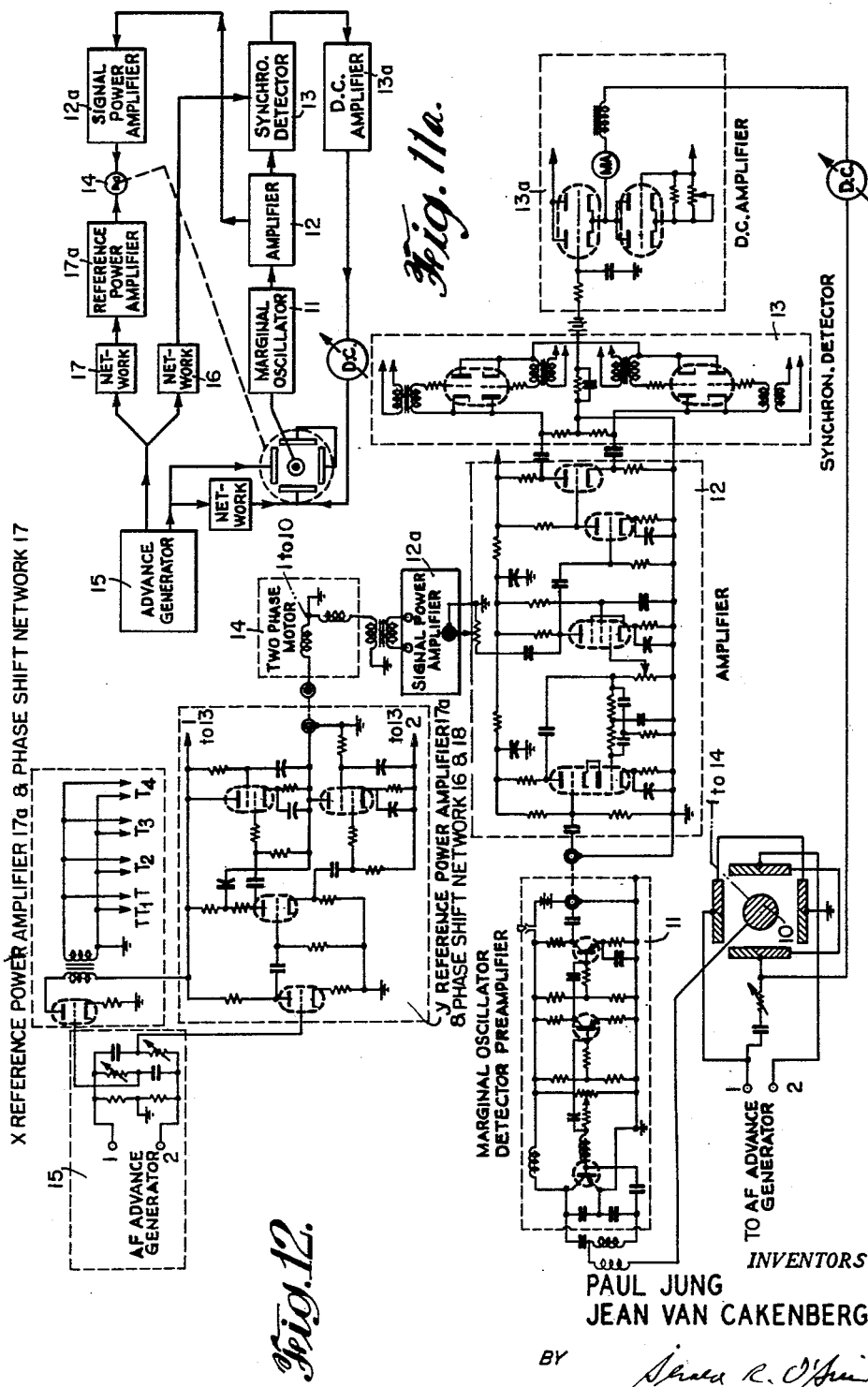

FIGURES 10a, 10b, and 10c show the variation with time of the $H_z$ sweep field, the resultant field $H''_t$, and the absorption in the paramagnetic substance, respectively;

FIGURE 11 is a diagrammatic representation of a two-dimensional embodiment of the present invention;

FIGURE 11a is the block diagram of FIGURE 11 rearranged and modified to correspond to the circuit diagram of FIGURE 12;

FIGURE 12 is a complete circuit diagram of the apparatus of FIGURE 11; and

Figure 13:
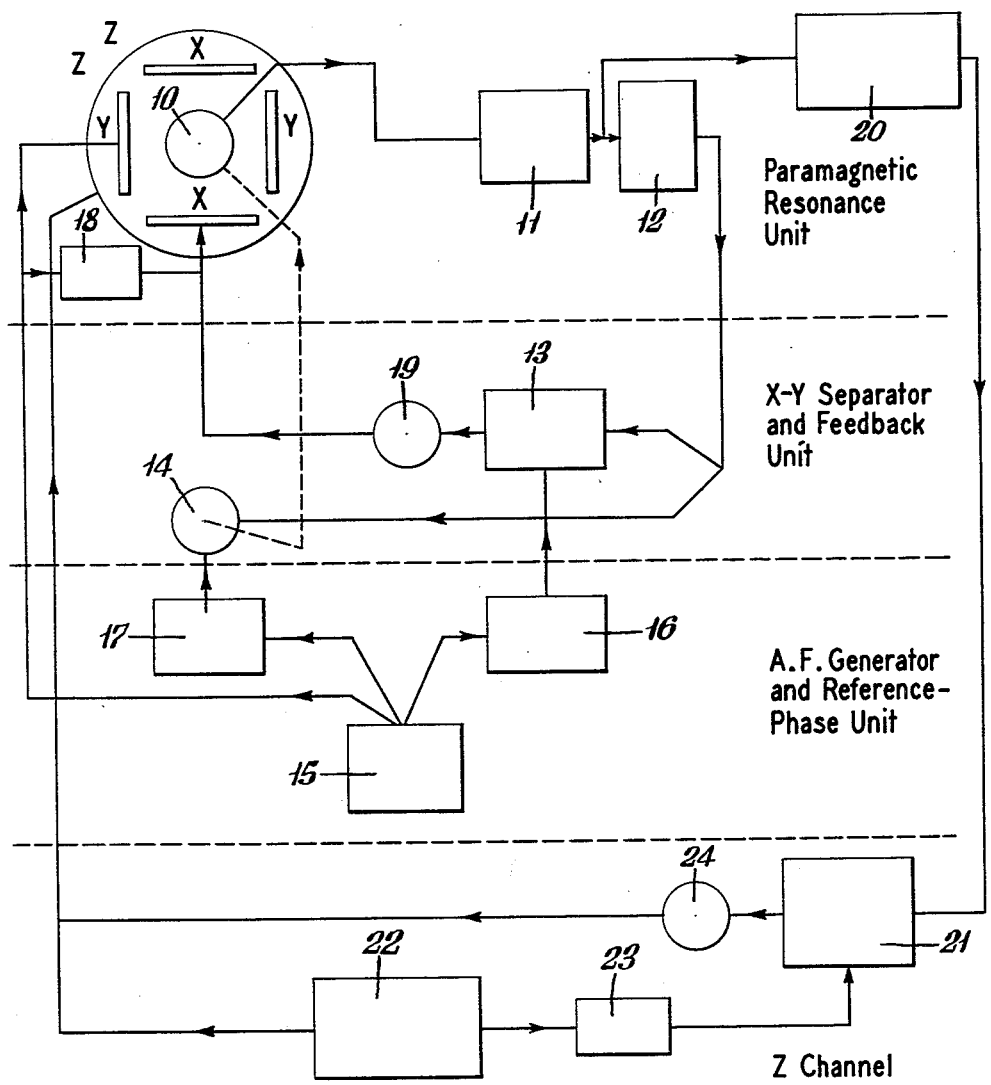

FIGURE 13 is a diagrammatic representation of a three-dimensional embodiment of the present invention.

It has now been found that instead of using three sweep fields of arbitrary magnitudes and frequencies, the complete determination of the direction and magnitude of an external magnetic field can be more easily achieved by using a rotating field of constant magnitude rotating with a constant angular velocity $w$ in one plane $(x, y)$ and an alternating field of angular velocity $w'$ sweeping in the direction transverse to the plane. The combination of these two fields produces the same result as three sweep fields perpendicular to each other, since a rotating field may be produced by the combination of two alternating fields of the same frequency and magnitude, but shifted in phase by $\pi/2$ radians.

The present invention also differs from the apparatus of our earlier file application in that the magnitude of the sweep fields is never allowed to be zero. In our former apparatus the sweep fields did pass through a zero value of magnitude. By maintaining the sweep field magnitude different from zero, the technical performance of our earlier described apparatus is greatly improved in that the detection of the output signal and the electrical circuit are simplified.

It is of importance in the present invention that the magnitude of the sweep field remain smaller than that of the resonance field in order that the paramagnetic absorption is an increasing function of the field.

In accordance with the present invention, there is provided a device for measuring the magnitude and direction of an external magnetic field comprising a paramagnetic substance, generator means for imposing a magnetic field on the paramagnetic substance, and means for measuring the asymmetrical variation of the resonance absorption of the paramagnetic substance as caused by the external magnetic field.

As in the apparatus of our earlier filed application, Serial No. 713,626, the determination of the magnitude and direction of an unknown magnetic field, and in particular weak magnetic fields such as that of the earth, depends upon the symmetrical properties of the sweep fields. In the absence of an external magnetic field, the paramagnetic absorption is a symmetrical function of the sweep field, as can be seen from the absorption patterns in the drawings. However, in the presence of an unknown external magnetic field, the paramagnetic absorption is no longer a symmetrical function, but is asymmetrical. The asymmetrical pattern created by the presence of an external field can be seen in FIGURE 10c. This asymmetrical variation can be detected by analyzing the resonance absorption, and the symmetry can be restored by a correcting signal, such as that described in our earlier filed application. By a symmetrical function is meant a function which is transformed into itself when its variable is changed from a positive to a negative value or vice versa.

A paramagnetic substance, such as a free radical, which is exposed to a high frequency field, $H_1$, can be made resonant by imposing on it a constant or a slowly varying field H, the axis of which is perpendicular to the axis of the high frequency field, as shown in FIG. 1. The paramagnetic absorption is a function of the magnitude of the constant or slowly varying field and can be represented by a bell-shaped curve as shown in FIG. 2. If the high frequency field $H_1$ is not perpendicular to the field H, the function $A = f(H)$ should be written $$A = f(H) \cos^2 \theta$$

where $\theta$ is the angle between $H_1$ and H, as shown in FIG. 1. The field H is a quasi-constant field, i.e., the field H varies at a rate much smaller than the relaxation time of the paramagnetic substance. A more detailed discussion of resonance and field dependency of magnetic absorption can be found in "Nuclear Magnetic Resonance" by E. R. Andrew, Cambridge University Press, Cambridge (1955).

The sweep field frequencies used to generate a resultant rotating field $H_r$ should be quasi-constant. The magnitudes of the sweep fields as well as that of the resulting field should be less than the magnitude of the resonance field $H_{res}$ indicated centrally of the bell curve of FIGURE 2. Under these conditions the paramagnetic absorption is an increasing function of the magnitude of the resulting field $H_r$ in the zone of interest. The "zone of interest" in the present invention is apparent from FIG. 2. When the magnitude of the resulting field $H_r$ increases below the resonance point value $H_{res}$, the absorption increases; when the field $H_r$ decreases below the resonance point value $H_{res}$, the absorption accordingly decreases.

Either the rotation of a properly designed magnetic system, or the combination of two alternating fields of frequency $w$ and of equal magnitude, but shifted in phase and space by $\pi/2$ with respect to each other, will produce a rotating magnetic field $H_r$.

As shown in FIG. 3 a rotating field in the $x$–$y$ plane may be represented by a vector of constant magnitude $H_r$, rotating with a constant angular velocity $w$ in the $x$–$y$ plane. If the $x$-axis is in the direction of the rotating field at the reference time $t = 0$, the position of the rotating field at any time $t$ is measured by the angle $\psi = w.t$.

Since the magnitude of the rotating field remains constant with respect to time, as shown in FIG. 4a, the corresponding absorption is constant with respect to time, as shown in FIG. 4b.

As shown in FIG. 5, if the $h_x$ and $h_y$ components of an unknown field $h$ at an angle $\phi$ with the $x$-axis interfere in the $x$–$y$ plane, the new field $H_t$ resulting from the combination of $H_r$ and $h$ ($h_x$, $h_y$, 0) is no longer constant with respect to time. As shown in FIG. 5 the combination of $H_r$ and $h(h_x, h_y, 0)$ results in a vector $H_t$, the origin of which is at C and the end of which follows the circle centered at B. It is apparent that the vector $H_t$ changes in magnitude as it rotates. The magnitude $H_t$ reaches a maximum when the rotating field is aligned with $$h(h_x, h_y, 0)$$

(point A in FIG. 5) and reaches a minimum when the rotating field is in the opposite direction (point D in FIG. 5). The value of $H_t$ can be calculated:

$$H_t = \sqrt{[h(h_x,h_y,0)]^2 + H_r^2 + 2[h(h_x,h_y,0)]H_r \cos(wt - \phi)}$$

The magnitude of $H_t$ changes as $H_r$ changes from $\psi$ to $-\psi$ and, $H_t$ is no longer a symmetrical function of the sweep field.

In FIGS. 6a and 6b the time variations of $H_t$ and of the corresponding absorption are shown. The absorption maximum and minimum are related to the space angle $\phi$ of the unknown field $h(h_x, h_y, 0)$ by $$wt_{max} = \phi + 2n.\pi$$
$$wt_{min} = \phi + (2n+1)\pi$$

wherein $n = 0, 1, 2, 3 \ldots n$.

Thus, in a two-dimensional system, the paramagnetic absorption is constant and independent of time in the absence of an unknown magnetic field. But in the presence of an unknown magnetic field (i.e., in the presence of the $x$ and $y$ components of the field to be measured), the paramagnetic absorption becomes a periodic function of time, the maximum and minimum of which occur respectively when the rotating field is aligned with the unknown field direction in plane $x$–$y$ or is in the opposite direction.

An electric signal having the fundamental frequency component can be produced by this absorption variation. The magnitude of the fundamental frequency component is approximately proportional to the magnitude of the field to be measured, and the phase angle of the signal is equal to the space angle of the unknown field.

To determine a third directional component of an unknown external magnetic field, sweeping must be performed in three directions: along the $x$, $y$, and $z$ axes. This can be done by using a rotating field $H_r$ in the $x$–$y$ plane and an alternating sweep field along the $z$-axis. The frequency of the rotating field should be different from that of the $z$-sweep field.

If the $z$-sweep field and the rotating field $H_r$ are combined, as shown in FIG. 7, the total sweep field can be represented by the resulting vector $H'_t$. The field $H'_t$ changes its magnitude as the $z$-field sweeps from $+H_z$ to $-H_z$ or vice versa. The resulting field passes twice from a maximum value $$|H'_t| = |\sqrt{H_r^2 + H_z^2}|$$

to a minimum value $H_r$ as the $z$-field completes a full cycle $(0, +H_z, 0, -H_z 0)$. $|H'_t|$ is thus a symmetrical function of the $z$-sweep field, and the absorption, as shown in FIG. 8, is similarly symmetrical. In FIG. 8, when the $z$-sweep field completes a cycle in time T, the total (or resulting) field $H'_t$ and the absorption complete a cycle in a time $T/2$. The absorption corresponding to the combination of a rotating field and a $z$-sweep field is a periodic function of time, the frequency of which is two times the frequency of the $z$-sweep field.

Referring to FIG. 9, it is assumed that an unknown external field is introduced into the above-described system having a constant magnitude and direction. Assume only one component of the external magnetic field $h$ affects the system and that this component is aligned along the $z$-axis. The resulting field along the $z$-axis will be equal to the sum of the $z$-sweep field and the $h_z$ component of the external field $h(0,0,h_z)$ when the $z$-sweep field completes one half-cycle, and to the difference of both fields when the $z$-sweep field completes the second half-cycle (in the opposite direction). The magnitude of the field $H''_t$ is a value which differs according to the half-cycle considered. When the sweep field completes the half-cycle $(0 + H_z, 0)$, the magnitude of $H''_t$ passes from a minimum $H_r$ to a maximum given by $\sqrt{H_r^2 + h_z + H_z)^2}$. While for the half-cycle $(0, -H_z 0)$ the magnitude of $H'_t$ passes from $H_r$ to another maximum equal to $\sqrt{H_r^2 + (h_z - H_z)^2}$. This is shown in FIGS. 10a, 10b, and 10c. The interference of one component of the external magnetic field introduces an asymmetrical variation in the magnitude of the total sweep field and, the corresponding absorption is no longer a symmetrical function of the sweep field.

When each of the three components $h_x$, $h_y$ and $h_z$ of the external magnetic field $h$ is different from zero, the total effect is determined by the superimposition of two variations: one of frequency relative to the angular velocity $w'$ (due to the $z$-sweep field) and a second of frequency relative to the angular velocity $w$ (due to the rotating field). The total effect is determined by the combination of an $w$ variation resulting from the combined effect of the rotating field with the $h_x$ and $h_y$ components of the external magnetic field and an $w'$ variation resulting from the combined effect of the z-sweep field with the $h_z$ component of the external magnetic field.

An electric signal is produced by this absorption variation which includes two fundamental frequency components respectively related to the angular velocities, $w$ and $w'$. The frequency component is related to the direction of the $h_x$, $h_y$ components of the external magnetic field by its phase angle (angle $\phi$ as defined above). The positive or negative direction of the $h_z$ component of the external magnetic field is given by the phase of the fundamental frequency $w'$ component with respect to the z-sweep field. The magnitude of the external magnetic field is given by the magnitude of the two fundamental components $w$ and $w'$.

A slight error is introduced by assuming that the magnitude of the two fundamental frequency components is proportional to the magnitude of the external magnetic field, but this error can be eliminated by using a null-method, as described in our earlier-filed application. Not only can the external magnetic field be compensated, but the compensating field can be aligned with the direction of the external field.

The present invention comprises two slightly different apparatus for determination of the direction and magnitude of an unknown field, i.e., a two-dimensional apparatus, which is of particular interest as an auto-pilot for ships, and a three-dimensional apparatus, which can be used in satellites, guide missiles and the like.

Each of these two apparatus has basic equipment which is quite similar. Furthermore, they are similar to the apparatus described in our earlier-filed application, but with some important differences.

In the present invention, both paramagnetic and ferromagnetic substances can be used. Diphenyl-picryl-hydrazil, sodium in liquid ammonia, ferrites and garnets, such as yttrium-iron garnet, $Y_3Fe_2(Fe_4)_3$, are operable.

Another important difference from our earlier filed application is that a rotating field $H_r$ can be obtained either by means of a small permanent magnet rotating with a suitable angular velocity $w$ or by two low frequency alternating fields having the same amplitude and frequencies, but shifted in phase and space by $\pi/2$ with respect to each other to produce the desired resultant field $H_r$ rotating at angular velocity $w$. The absolute magnitude of the resultant rotating field $H_r$ should be smaller than the magnitude of the resonance field $H_{res}$, as shown in FIGURE 2. The z-sweep field is a low-frequency alternating field having a smaller magnitude than that of the resonance field. The angular velocity $w'$ of the z-sweep field should preferably be smaller than the angular velocity frequency $w$ of the rotating field. It is also preferable that $w'$ not be a multiple or a sub-multiple of $w$. The values of $w$ and $w'$ should be selected so that their respective harmonics do not substantially interfere with each other.

Referring now to FIGS. 11 and 12, in the two-dimensional embodiment of our invention, the signal from the absorption variation in the paramagnetic substance disposed within the radio frequency coil 10 is developed across a resistance in the radio-frequency oscillator-detector unit 11 and amplified by an audio-frequency amplifier 12 to a convenient level for synchronous detection. The x-component of this signal is detected by a synchronous detector 13, the reference phase of which is adjusted so as to be sensitive only to the x-component. Synchronous detector 13 may be followed in the circuitry by a signal booster device such as for example, a D.C. amplifier 13a. A two-phase motor 14 having a reference phase adjusted so as to be sensitive only to the y-component, detects the y-component of the signal from the audio-frequency amplifier 12. A signal power amplifier 12a may also be advantageously used to boost the signal power input to the two-phase motor 14.

These reference signals are taken from the low-frequency oscillator 15 (AF Advance Generator) through the phase shift networks 16 and 17 and are fed into the synchronous detector 13 and the two-phase motor 14. FIGURES 11a and 12 indicate that $x$ and $y$ reference signal amplification may also be incorporated into the circuitry by inclusion of a reference signal power amplifier 17a. The phase shift of the x- and y-components of the rotating field is obtained by the phase shift network 18. The power for the phase shift networks and for the rotating field system is supplied from the oscillator 15.

The direct current signal from the detector 13 is proportional to the x-component of the fundamental frequency. After amplification, it is fed into the x-low frequency coil through the current measuring device 19. The signal acting on the two phase motor 14 is proportional to the y-component. The motor applies a torque to the alignment system (x-coils, y-coils, and radio frequency coils supported on a platform) by means of which the x- and y-coils can jointly rotate about the z-axis. The coils stop rotating when the x-coil is aligned with the external magnetic field $h$. The y-signal then becomes zero.

Referring now to FIGURE 13, which shows a diagram of the three-dimensional embodiment of our invention, pieces of apparatus which are the same as those used in the two-dimensional apparatus are given identical reference numerals. In addition, this apparatus includes z-coils which provide the z-sweep field of frequency corresponding to angular velocity $w'$. The $w'$ component of the signal is taken from the oscillator-detector 11 or the audio-frequency amplifier 12 at a convenient level and fed into a z-channel amplifier 20. The signal at the output of this amplifier is fed into a synchronous detector 21 the reference phase of which is taken from the audio-frequency generator 22 through a phase-shift network 23. The generator 22 also supplies power to the z-coils.

The output current of the synchronous detector 21 is fed back into the z-coils to compensate the z-component of the unknown external magnetic field through a z-current measuring device 24.

To illustrate the operation of the invention, assume the magnitude and direction of an unknown magnetic field $h$ is to be measured by means of the apparatus of the invention and that the magnitude of $h$ is between $-1$ gauss and $+1$ gauss.

Upon current flowing through the two-dimensional apparatus, it will adjust until a stop-position is reached. The current measuring device 19 in FIG. 11 gives the magnitude of the field component in the $x$–$y$ plane while the direction of the $x$–$y$ component is given by the position of the x-coil axis.

The two-dimensional device is intended for measuring only two components of the unknown field $h$, but can be used for measuring the third component if needed, provided that the unknown field $h$ is constant in magnitude and direction for a period of time sufficiently long for proper measurement to be made. The alignment system of the apparatus is, for instance, manually rotated about the y-axis until a maximum is read over the current measuring device. At this position, the x-axis is aligned with the unknown magnetic field and its absolute magnitude is given by the reading on the current measuring device.

If the magnetic field to be measured varies in magnitude and/or direction, measurement should be made by the three-dimensional apparatus (provided that the field variations are slower than the time response of the measuring device). Upon switching on the three-dimensional apparatus, the $x$–$y$ operation occurs in a manner similar to the two-dimensional apparatus. The feed-back current through the z-coils causes a reading on the z-current measuring device which is proportional to the z-component of the unknown field $h$. The total magnitude of $h$ is given by $|h|^2 = h_x^2 + h_z^2$ and the angle $\theta$ between the field direction and the $x$-axis is given by $$\theta = \text{arctg}\frac{h_z}{h_x}$$

If the $z$-component is compensated by means of a mechanical feed-back system, e.g., by rotation of the $x$–$y$ coils about the $y$-axis, the apparatus will adjust itself to a position in which the $x$-axis points in the direction of the unknown field and its magnitude is given by the reading on the current measuring device.

*Example I*

A working model of the two-dimensional apparatus of this invention was constructed using an ordinary magnetic deflection system for television tubes as the X and Y coils. The field of such a system is not homogeneous and the results obtained were poor in comparison with that which could be obtained by proper design.

One gram of $xx'$ diphenyl $\beta$ picryl-hydrazil was used as the paramagnetic substance. The resonance frequency was 9.3 megacycles and the frequency of the $H_x$ and $H_y$ fields was 400 cycles per second. The speed of angular response was 1 radian per second and the minimum detectable angular change was $5 \times 10^{-3}$ radian.

*Example II*

An apparatus similar to that of Example I was constructed except that low frequency $z$-coils were added around the paramagnetic substance. Performance was similar to that obtained in Example I except that the $x$-axis aligned itself with the direction of the field.

The apparatus of this invention measures both magnitude and direction of an "unperturbated" external magnetic field, that is, the inventive device does not contain parts which change the magnetic properties of the space at the measurement location and does not introduce a permanent magnetic momentum.

The average sweep field is zero and therefore does not introduce a permanent magnetic momentum when the rotating field is obtained by the proper combination of two alternating sweep fields and when the magnetic substance used is a paramagnetic substance such as a free radical. When one uses a ferrite or any other magnetic substance which introduces a permanent magnetic momentum, the inventive apparatus must be slightly modified in order to compensate the effect of this momentum upon the external field to be measured.

The invention can be used for measuring magnetic fields, preferably weak magnetic fields (practical range from 0 to about 5 gauss). It is also a very convenient instrument for measuring a "zero" magnetic field.

Many uses for this invention are apparent. It can be used in astrophysics, in particular as magnetometer or magnetic compass in all types of out-of-space vessels, guided missiles, artificial satellites and rockets, in geophysics, in particular geophysical surveying, mining prospection, as an auto-pilot for planes, rockets, ships and magnetic detectors.

What is claimed is:

1. Apparatus for measuring the magnitude and direction of an external magnetic field comprising: a paramagnetic substance having a determinable magnetic resonance absorbtion frequency and magnitude characteristic; first generator means for imposing on said paramagnetic substance a high frequency magnetic field, second generator means for imposing on said substance a low frequency magnetic field parallel to said high frequency field and having a frequency and a magnitude less respectively than the characteristic magnetic resonance absorption frequency and magnitude of said paramagnetic substance, and third generator means for imposing on said substance a magnetic field of constant magnitude less than the magnetic resonance absorption magnitude of said paramagnetic substance rotating with a constant angular velocity less than the angular velocity corresponding to the magnetic resonance absorption frequency of said paramagnetic substance in a plane perpendicular to the axis of said low frequency field; and means for measuring asymmetrical variations in the absorption of said paramagnetic substance.

2. A method for measuring the magnitude and direction of an external magnetic field comprising: subjecting a paramagnetic substance having a determinable magnetic resonance absorbtion frequency and magnitude characteristic to a high frequency magnetic field, a low frequency magnetic field parallel to said high frequency field and having a frequency and magnitude less respecitively than the characteristic magnetic resonance absorbtion frequency and magnitude of said paramagnetic substance, and a magnetic field of constant magnitude less than the characteristic magnetic resonance absorption magnitude of said paramagnetic substance rotating with a constant angular velocity less than the angular velocity corresponding to the characteristic magnetic resonance absorbtion frequency of said paramagnetic substance in a plane perpendicular to the axis of said low frequency field; subjecting said paramagnetic substance to said external magnetic field; and obtaining a measurement of the asymmetrical variations in the absorption of said paramagnetic substance.

References Cited in the file of this patent

UNITED STATES PATENTS

| 2,960,649 | Bloch | Nov. 15, 1960 |

FOREIGN PATENTS

| 746,114 | Great Britain | Mar. 7, 1956 |
| 1,180,455 | France | Dec. 29, 1958 |

OTHER REFERENCES

Ingram et al.: Philosophical Magazine, vol. 45, No. 370, Nov. 1954, pp. 1221 to 1223.

Wertz: Chemical Reviews, vol. 55, No. 5, Oct. 1955, pp. 930 and 931 principally relied upon.

Manus et al.: Academie des Sciences, Comptes Rendus, vol. 239, No. 5, Aug. 1954, pp. 414 and 415.

Manus et al. Journal de Physique et Le Radium, vol. 15, No. 5, May 1954, page 378.

Pound et al.: The Review of Scientific Instruments, vol. 21, No. 3, March, 1950, pp. 219 to 225.

Carver et al.: Physical Review, vol. 102, No. 4, May 15, 1956, pp. 975 to 980.

Bell et al.: Physical Review, vol. 107, No. 6, Sept. 15, 1957, pp. 1559 to 1565.

Dehmelt: Physical Review, vol. 109, No. 2, Jan. 15, 1958, pp. 381 to 385.